(No Model.)
F. P. CROSBY.
PROCESS OF BRAZING.
No. 507,974. Patented Oct. 31, 1893.
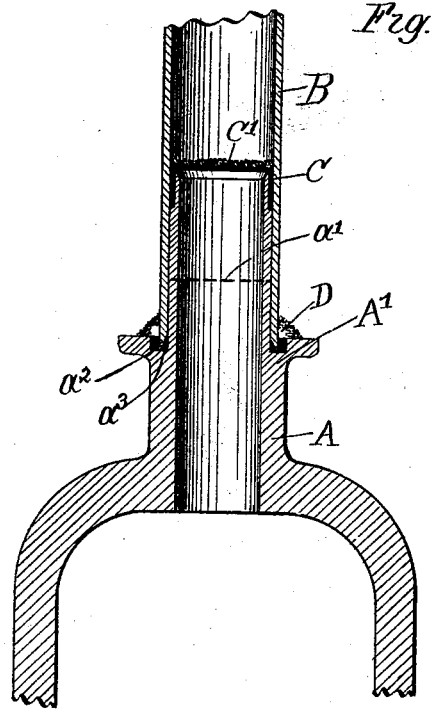
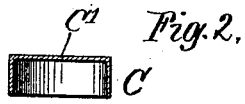
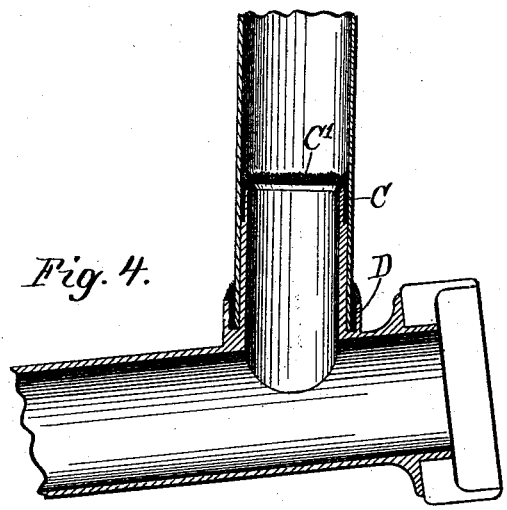
Witnesses.
E. T. Wray.
Jean Elliott
Inventor,
Frank P. Crosby
By Burton and Burton
his Attys

UNITED STATES PATENT OFFICE.

FRANK P. CROSBY, OF CHICAGO, ILLINOIS, ASSIGNOR OF TWO-THIRDS TO FRANK J. LAMBERSON AND FRANK H. WEBSTER, OF SAME PLACE.

PROCESS OF BRAZING.

SPECIFICATION forming part of Letters Patent No. 507,974, dated October 31, 1893.

Application filed October 17, 1892. Serial No. 449,091. (No specimens.)

*To all whom it may concern:*

Be it known that I, FRANK P. CROSBY, a citizen of the United States, residing at Chicago, county of Cook, and State of Illinois, have invented certain new and useful Improvements in Processes of Brazing, which are fully set forth in the following specification, reference being had to the accompanying drawings, forming a part thereof.

This invention is designed to improve the methods employed in brazing tubular parts together, and is especially planned with reference to the style of joints of this class which are employed in the construction of velocipedes having tubular frames, and, in addition to simplifying and facilitating the process itself, it is intended to afford the further advantage of making the joint hollow and avoiding a difficulty commonly experienced in the present processes, which arises on account of the fact that the surfaces to be joined are in many instances wholly interior to the tubing and inaccessible after the joint is being formed, so that in order to secure a perfect joint a quantity of the brazing alloy very largely in excess of the amount necessary to effect the junction is inserted in order to insure a sufficient quantity reaching the proper point, and this large quantity is necessarily left in the parts adding greatly to the weight without utility, and often being formed into detached globules in the process of fusing which rattle around in the frame to the great annoyance of the users of the machine. Instead of applying the brazing metal merely adjacent to the surfaces which are to be united where it will, when fused, flow between said surfaces and effect the junction, I form it into a band, or annulus, or cap, or cup, or disk, or such other form as the form of the joint requires, and I cut away the parts to be joined so as to produce a seat or cavity which will be accurately fitted by the band, disk or cap of the brazing metal so that instead of brazing metal fusing and flowing into the joint, it occupies before fusing precisely or substantially the position it will occupy after it has become fused and effected the union. In connection with this general feature, I employ certain specific details for the purpose of enabling the operator to ascertain with certainty when the fusing is complete.

In the drawings,—Figure 1 is an axial section through the forging which forms the neck and shoulders of the fork of a velocipede, and through the tubular portion of the head which is brazed to the upper end of said forging, the junctions being effected by my invention, and the brazing metal being illustrated in the form in which it is prepared for brazing according to my process. Fig. 2 is a detail section of a particular form of the "brass" which I employ at one of the brazed joints. Fig. 3 represents similarly an annulus of brazing metal which I employ at a different point. Fig. 4 is a section of another joint of the tubular frame substantially similar to that shown in Fig. 1, but such as is found at a different part of the machine, and illustrating a slight modification of the mode of applying my invention.

In each of the instances selected for illustration, there are two points at which junction is effected by brazing,—viz: at the end of the tube and at the end of the forging within the tube. The latter junction is or may be readily made an exterior junction and the fusing can be observed, but the latter is an interior junction and the fusing cannot be observed. Moreover, at the former, the brass or brazing alloy is applied visibly, and the quantity can be somewhat limited and any excess can be removed, but at the other point this cannot be done. It is customary at these junctions to bore out the upper end of the shank A' of the forging A, which is forged solid, to form a pocket which might extend, for example, down to the dotted line a' on Fig. 1, and the brazing metal in the granular or pulverized form, mixed with water to make it adhesive and cause it to be retained to some degree while the fusing is accomplished, is put into this pocket filling it up to the upper end and extending still farther up into the tube B, so that when heat is applied exteriorly there will be a sufficient quantity of the brass, which, being fused, will flow to some extent between the exterior surface of the shank and the inner surface of the tube, and, lapping both surfaces, will effect a perfect union between the parts. Said surfaces, it will be understood, will be rendered bright in order that such union may occur. In this manner, as above explained, a very greatly excessive quantity of brazing metal is employed, and frequently some portion of it is left in pellets causing the annoyance stated. At the exterior junction at the end of the tube, the brazing is heaped upon the surfaces, and when fused, in addition to flowing into the joint where its presence is required, it flows to a still greater extent over all adjacent parts, and necessitates a large amount of labor in cleaning off the excess besides wasting the metal. Furthermore, expert judgment is required in order to ascertain when the fusion occurs at the inner concealed joint, and for lack of perfect judgment, the joint is somewhat imperfectly formed.

According to my invention, the brazing metal, instead of being left in the granular or pulverized form, is in the form of a sheet metal ring disk or cap which I call a "brass." For the purpose of the joint at the upper and concealed end of the shank, I make it in the form of a cap or inverted cup C, shown in Fig. 2. The end of the shank is turned down to form a seat over which the cap fits accurately, and its exterior surface fits as accurately within the tube. For the junction at the lower end of the tube, I form the "brass" as an annulus D, and a seat or socket for this annulus is formed in the shoulder of the forging, the annulus fitting closely about the exterior surface of the end of the tube and as closely within the seat thus formed for it. The end of the tube is reamed out forming the taper edge $a^2$, and leaving a space $a^3$, the counter-part of that shape, between the shank and the tube at the end of the latter. Into this space, a portion of the "brass" should flow when fused, and in order that there may be a suitable portion for said purpose, the "brass" D extends a little higher,—that is, the annulus is a little wider—than the depth of the seat made for it in the shoulder of the forging. The parts are assembled in the manner shown in Figs. 1 and 4. The flux preferably in the form of paste is placed upon the diaphragm or head of the brass cap C, and a suitable quantity is lodged upon the shoulder of the forging over the protruding margin of the "brass" D. Heat being applied, the fusion of the brass C will be known by the melting of the head or diaphragm C' thereof, and the melted metal dropping down through the stem or shank, which is bored throughout in order both to lighten it and to permit this specific result in the process of brazing. As to the exterior joint at the lower end of the tube B, the completion of the fusion can be observed without difficulty. As the metal becomes liquid, it will flow down around the end of the tube into the cavity $a^3$, and when the process is completed, the exterior surface will be neat and clean and devoid of any considerable metal which will require cleaning off, and the interior joint, it is evident, will be also neatly formed with the slightest possible excess of metal, since substantially all the diaphragm C' of the cap C will fall through the shank and escape entirely from the joint.

In the form shown in Fig. 4, the bore through the shank or the part which corresponds to the shank of Fig. 1, leads into another branch of the frame through which the droppings from the diaphragm C' will escape. In this figure, also, I have shown the outer and lower end junction without the provision for the cavity $a^3$, which is shown in Fig. 1, and therefore without having the "brass" D wider than the depth of the seat which is formed for it around the end of the tube.

I claim—

The process of brazing one tube within another, which consists in forming upon the outer surface of the inner tube a seat for the brazing metal, forming the brazing metal into a cup or cap whose flange is conformed to such seat, applying the same to cap the end of the inner tube, supporting the flux on the diaphragm of said cap or cup, and applying heat to the tubes until said diaphragm is fused: substantially as set forth.

In testimony whereof I have hereunto set my hand, in the presence of two witnesses, at Chicago, Illinois, this 11th day of October, 1892.

FRANK P. CROSBY.

Witnesses:
CHAS. S. BURTON,
JEAN ELLIOTT.